April 28, 1970     G. E. LIGHTNER ET AL     3,508,442
AUTOMATIC LIQUID SAMPLER FOR CHROMATOGRAPHY
Filed Sept. 18, 1968     6 Sheets-Sheet 5

INVENTORS
Gene E. Lightner
Frederick J. Debbrecht
BY Lawrence J. LaBarre
Mortenson and Weigel
ATTORNEYS

INVENTORS
Gene E. Lightner
Frederick J. Debbrecht
Lawrence J. LaBarre
BY Mortenson and Weigel
ATTORNEYS United States Patent Office 3,508,442
Patented Apr. 28, 1970

3,508,442
AUTOMATIC LIQUID SAMPLER FOR CHROMATOGRAPHY
Gene E. Lightner, Kennett Square, Pa., Frederick J. Debbrecht, Wilmington, Del., and Lawrence J. La Barre, Mountain View, Calif., assignors to Hewlett-Packard Company, Palo Alto, Calif., a corporation of California
Filed Sept. 18, 1968, Ser. No. 760,538
Int. Cl. G01n 1/14
U.S. Cl. 73—423                         10 Claims

ABSTRACT OF THE DISCLOSURE

The apparatus described automates a precision microliter liquid syringe. The barrel for the syringe is mounted in a bracket adapted to be displaced along the axis of the barrel by a first prime mover. The plunger of the syringe is operated by a second prime mover mounted on the bracket. A third prime mover is positioned to shift the first prime mover. These three prime movers permit the syringe needle alternatively to be inserted into a sample bottle filled with the sample, removed, and then shifted to be in alignment with the injection port of a gas chromatograph. The syringe needle is then inserted into the injection port of the chromatograph, the sample injected, the next sample indexed to the sample pickup location. The complete sample pickup and injection cycle is controlled by the three prime movers which may be digitally controlled in any desired sequence.

This invention relates to an automatic fluid sampler and, more particularly, to an automatic sampler that is particularly useful in a fully automatic analytical system and is compatible with both data acquisition and manual interfaces.

BACKGROUND OF THE INVENTION

With the increased cost of the utilization of direct manpower for performing analyses using gas chromatographs and other analytical instruments, it is becoming more and more imperative to provide both semi and fully automatic systems for performing such analyses. Two of the most time consuming functions for the analyst are sample injection into the gas chromatograph, or other analytical instrument, and data interpretation and quantization. Integrators, multiplexers, A/D converters, and computers allow substantial savings in these latter areas. Unfortunately, however, full automation still awaits the development of a versatile, reliable automatic sampler-injector. This automatic sampler-injector should be capable of extracting a precise sample of a fluid to be analyzed from a sample container and inject the same into the analytical instrument.

In the case of gas chromatography several such systems have been developed. One of these systems utilizes a rotating valve which has a number of sample volume ports. The rotating valve is rotated to position these ports successively into a line leading to the gas chromatograph injection port. A volume of wash solvent may be used to flush the total sample into the injection port. Unfortunately, such systems have encountered problems. Among these problems have been the solvent peak showing up in the resulting chromatogram, leaks between the adjacent ports resulting in cross-contamination of the sample, and, finally, the apparatus has required careful cleaning by hand after each use.

Other techniques have envisioned vapor rather than fluid sampling. These require that the liquid sample be vaporized and the vapor sampled with a conventional gas chromatograph gas sampling valve. This technique is workable but is accompanied by the problems of temperature and pressure control of the sample. Without relatively precise temperature and pressure control, sample sizes tend to vary resulting in inaccuracies of the analysis. Cleaning has also been a problem.

Still other techniques have envisioned utilizing a low melting point sample tube made of an alloy. The liquid sample is loaded into a tube and the ends crimped. The tubes are loaded into an automatic rotating feeder which injects the tubes into a heater where the tube is melted and the sample vaporized. Unfortunately, this technique has resulted in wide variation in sample size and considerable manpower being required to load the sample tubes in the first instance. Furthermore, the different melting rates of the tubes causes variations in the temperature programmed analysis. Other techniques such as the use of preloaded syringes has also been proposed but is accompanied by problems in the successful implementation thereof.

It is, therefore, an object of this invention to obviate many of the disadvantages of the prior art automatic fluid sampling devices.

Another object of this invention is to provide an automatic fluid sampler which is relatively simple in construction.

Still another object of this invention is to provide an automatic fluid sampler which is capable of operating under the control of digital input signals.

BRIEF DESCRIPTION OF THE INVENTION

The automatic sampler in a preferred embodiment of the invention mounts a sample transfer means such as a conventional microliter syringe in a bracket. A first actuating means is adapted to displace the bracket along the axis of the barrel of the syringe. A second actuating means mounted on the bracket operates the syringe plunger. A third actuating means shifts the first actuating means and hence the syringe and second actuating means between a sample pickup location and a sample discharge point. A sample holder positions a plurality of discrete fluid sample containers. As the successive sample containers are indexed into a sample pickup location, the automatic sampler by selectively energizing the several actuating means, withdraws a sample from the sample container, shifts the syringe into alignment with a sample discharge point, such as the injection port of a gas chromatograph, and injects the sample at the discharge point.

In one embodiment of the invention, each of the actuating means is digitally energized so that under the control of three digital signals, the entire sampling operation is performed. The sampling operation may include a number of ancillary operations such as suction and pump cycles to flush air bubbles out of the syringe. Many other cycles and sequences are possible, all under the control of an easily established or modified digital program.

BRIEF DESCRIPTION OF THE DRAWINGS

The novel features that are considered characteristic of this invention are set forth with particularity in the appended claims. The invention itself, however, both as to its organization and method of operation as well as additional objects and advantages thereof, will best be understood from the following description when read in connection with the accompanying drawings in which:

DESCRIPTION OF THE PREFERRED EMBODIMENT

As may be seen in FIGS. 1–5, inclusive, the automatic sampler of this invention is in the form of a detachable assembly adapted to be mounted at the injection port 10 of a gas chromatograph 12 or sample inlet of some other analytical instrument. For simplicity of description, the invention will be described in conjunction with a gas chromatograph. The injection port of a gas chromatograph is sealed by a rubber septum held on by a cap nut 14. The cap nut has a tapered orifice through which the needle 16 of the syringe 18 or other suitable fluid transfer means may pass. The syringe 18 may be a conventional precision fluid syringe as typically employed in gas chromatography. The syringe has a barrel 20 in which a plunger 22 is adapted to slide to transfer fluid from and to the syringe through a needle 16.

Figure 7:
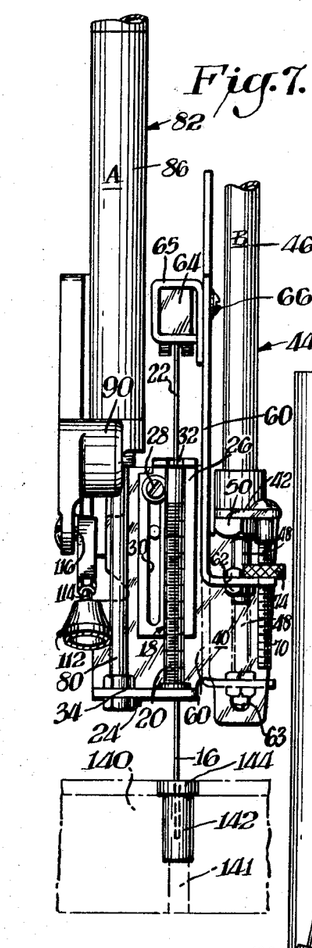
FIGURE 7 is a partial back elevation view of the automatic sampler of this invention illustrating the sequence position of FIG. 6.

The barrel 20 of the syringe 18 may be held in a two-piece, adjustable width, U-shaped bracket 24. The width of the opening of the U-shaped bracket is adjustable as by the sliding member 26 secured by the screw 28 which fits into a slot 30 (FIGS. 4 and 7) in the sliding member 26. The adjustable width is necessary or desirable to accommodate different syringes having different barrel lengths. If a single syringe is to be used, the U-shaped bracket 24 may be a unitary piece.

The upright portions 34 of the "U" bracket 24 each have concave indentations 35 (FIG. 1) in their inner surfaces to provide a means of accommodating and more securely positioning the ends of the barrel 20. The upright 34 of the U-shaped bracket which positions the plunger end is slotted 32 such that the plunger 22 may be slipped in from the side when the barrel is being mounted. In like manner, the upright portion 34 positioning the needle has an orifice (not shown) therein to accommodate the needle 16 which extends therethrough.

Figure 1:
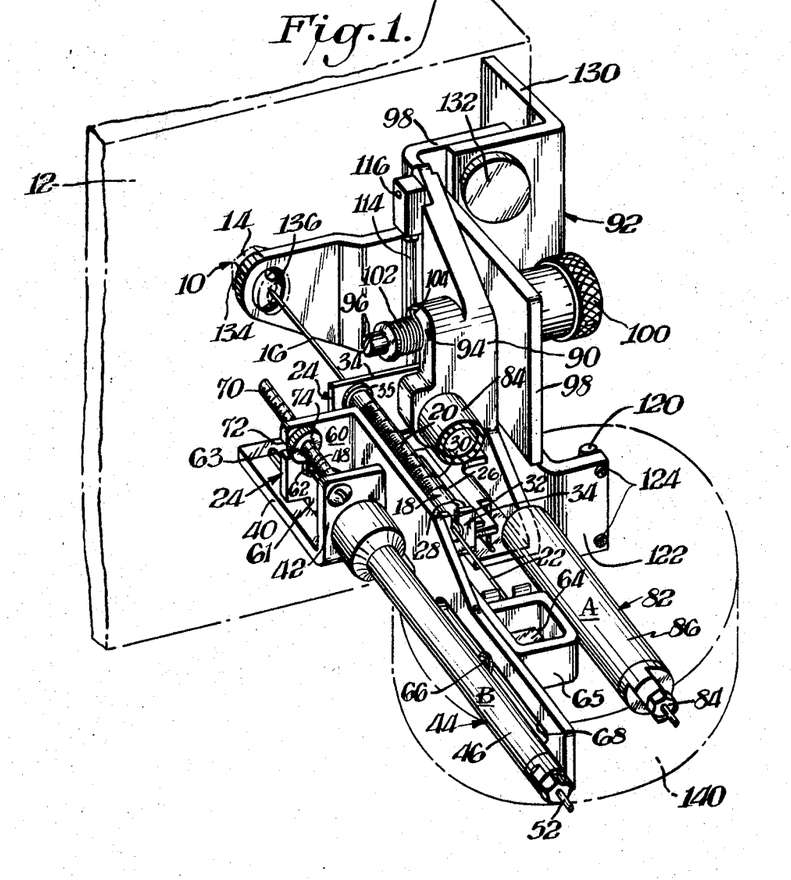
FIGURE 1 is a perspective view of the automatic sampler of this invention using a syringe positioned for injecting a sample into the injection port of an analytical instrument such as a gas chromatograph.
Figure 4:
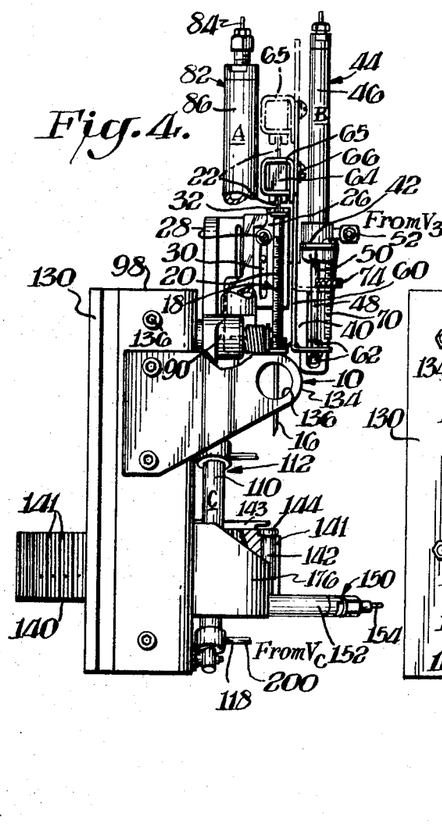
FIGURE 4 is a back elevation view of the automatic sampler illustrated in FIG. 2 showing by a phantom representation a portion of the rinse cycle for the syringe.
Figure 5:
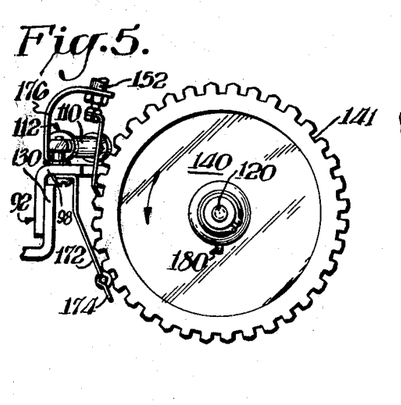
FIGURE 5 is a bottom view of the circular turntable in which the samples are held and positioned.

The U-shaped bracket 24 contains a side projection 40, a portion of which is bent upwardly in FIG. 1 of the drawing to form a side arm 42 on which is mounted a prime mover or actuating means 44. Although any type of prime mover 44 may be employed, those that are particularly preferred for use with this invention are prime movers capable of providing a linear or displacement type motion under the actuation of a digital signal. One type of prime mover which has been utilized successfully is a pneumatic cylinder which has a barrel portion 46 and a piston 48. The barrel 46 has its exterior portion threaded and secured to the side arm 42 as by a bolt 50 (FIG. 4). Air, or other fluid, which may be used to actuate the prime mover 44, is introduced through a nipple 52. The piston 48 is normally extended as seen most clearly in FIG. 4, and, when actuated as by air pressure applied to the nipple 52, pulls the piston 48 into the barrel 46 as illustrated by the phantomed lines in FIG. 4. The prime mover 44 is spring loaded so that when the air pressure is released the piston 48 returns to the extended position illustrated in FIG. 4 by the solid lines. In the alternative, a double acting pneumatic cylinder may be used in which event the piston 48 is driven in both directions.

Figures 8, 9:
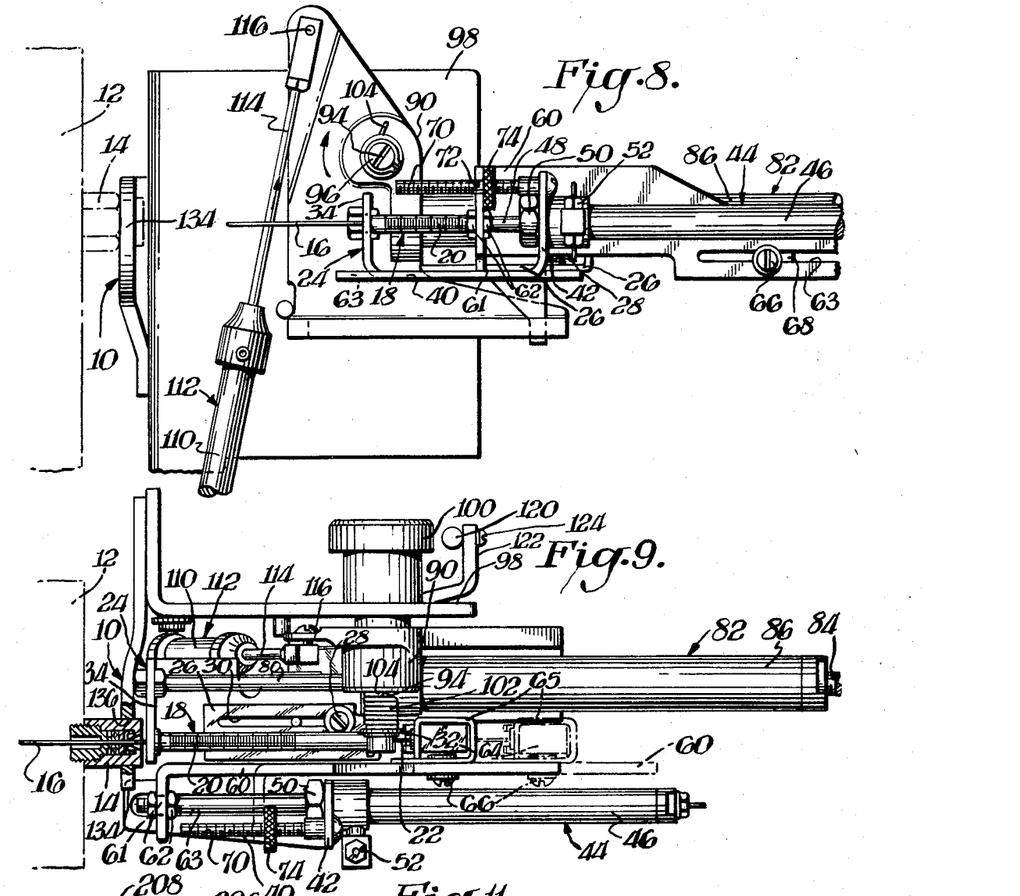
FIGURE 8 is a side elevational view of the automatic sampler of this invention showing the syringe in a position immediately prior to the samples' injection into a gas chromatograph.
FIGURE 9 is a top view of the automatic sampler illustrated in FIG. 2 with the syringe injecting a sample into the injection port of the gas chromatograph; the operation of the syringe plunger being shown in phantom.

Secured to the end of the piston 48 as by a pair of nuts 62 is an L-shaped bracket 60. The L-shaped bracket 60 extends along the side of the barrel 46 and mounts a clip 64 which engages the plunger thumb disc 66 (seen most clearly in FIG. 9) on the end of the plunger 22. The plunger clip 64 is mounted on a box-shaped mount 65 formed by bending a rectangular piece of sheet metal having one side attached as by a screw 66 to a slot 68 formed in the L-bracket 60. This permits the length of the plunger stroke to be adjusted according to the size syringe employed. The plunger clip 64 consists of a piece of spring metal 68 fastened to the box-shaped mount 65 and bent to accommodate the plunger. The plunger clip 64 is also slotted to permit the plunger thumb disc 66 to be simply slid into the clip. Other plunger clipping arrangements may be employed. For example, the plunger may be secured as by a tube having a hole which accommodates the plunger and a set screw to secure the rod therein.

The side arm 42 of the U-bracket 24 has a screw 70 inserted therethrough which extends through a slot 72 in the L-bracket 60 to facilitate the axial motion (FIG. 4) of the L-bracket when the prime mover 44 is actuated. A knurled nut 74 threaded on the screw 70 may be turned to adjust the length of the plunger stroke by limiting the return stroke of piston 48. The L-shaped bracket 60 has a projection 61 which engages a guide slot 63 in the bracket side arm 40 to prevent rotation of the bracket 60 as it is actuated by the plunger of the prime mover 44.

The U-bracket 24, which mounts the syringe, is mounted on the end of the piston 80 of a second actuating means or prime mover 82. The second prime mover 82 may be of the same type as the first mentioned prime mover 44 and has an input air nipple 84 which causes the plunger or piston 80 to extend lineally from the cylinder 86 which forms the prime mover 82. In this manner, when the second prime mover is actuated, the syringe barrel 20 is moved along an axis parallel to the axis of the barrel 20 under the control of a digital input signal which energizes the prime mover. Since the plunger of the prime mover 82 is mounted by the U-bracket 24, it also moves along this same axis. The plunger 80 of the prime mover 44 can, of course, be individually energized to operate the plunger 22 of the syringe regardless of the position of the barrel 20.

The cylinder 86 of the second prime mover 82 in turn is mounted on a pivot assembly 90 which is pivotally mounted to a mounting assembly 92. The pivot assembly 90 is in the general form of an angle bracket having a pivot point 94 through which a pivot rod 96 extends. The pivot rod 96 is secured to an L-flange 98 forming part of the mounting assembly 92 by a knurled knob 100 which is secured to the pivot rod as by a set screw. An axially directed pin (not shown) on the knob 100 engages a receptacle formed in the L-flange 98 to prevent the knob's rotation. A coil spring 102 placed over the rod 96 has one end secured in a slot in the pivot rod 96 and the other end secured as seen at 104 to the pivot assembly 90. The spring 102 is loaded such that the pivot assembly 90 is biased to an upright or vertical (cylinders up) position in the drawing.

Figure 2:
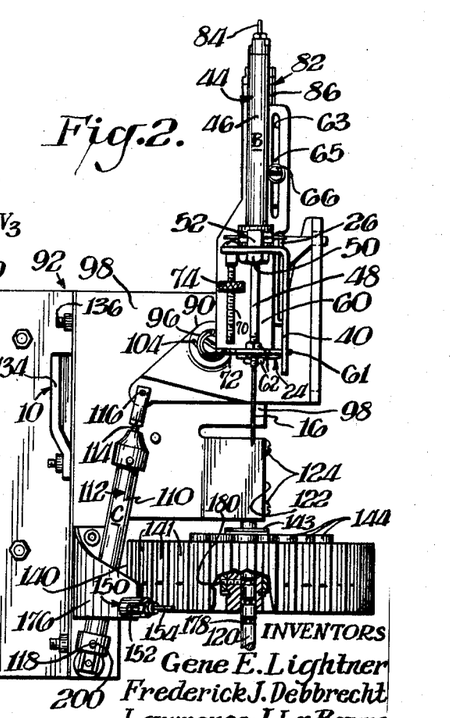
FIGURE 2 is a side elevation view of the automatic sampler shown in a rest position.

Secured to the lower portion of the L-flange 98 is the barrel 110 of a pivot prime mover 112 (FIG. 2). The pivot prime mover 112 has a piston 114 which, when the prime mover is energized, extends lineally outwardly from the barrel 110. The piston 114 is attached as by a pin 116 to an arm of the pivot assembly 90 so that when the pivot prime mover 112 is energized the syringe 18 is pivoted from a vertical to a horizontal position in the drawing as seen in FIG. 1. The pivot prime mover 112 is spring loaded so that the syringe 18, aided by the coil spring 102, normally assumes an upright position, i.e., the axis of the syringe and barrel are vertical. An air nipple 118 is available on the barrel 110 to permit the pivot prime mover to be energized. Here again the pivot prime mover 112 may be the same as the prime movers previously disclosed herein.
able on the barrel 110 to ermit the pivot prime mover to be energized. Here again the pivot prime mover to be energized. Here again the pivot prime mover 112 may be the same as the prime movers previously disclosed herein.

Figure 3:
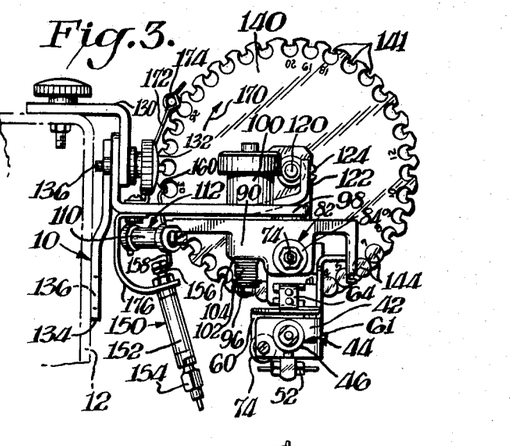
FIGURE 3 is a top view of the automatic sampler illustrated in FIG. 2.

A vertically disposed turntable supporting rod 120 is secured to an angular flanged portion 122 (FIGS. 1 and 3) of the L-flange 98 as by screws 124. The L-flange 98 has an angle bracket 130 secured thereto as by a bolt having a knurled adjusting knob 132 (FIG. 3). Separately attached to the L-flange 98 is an injection port frame bracket 134 having an orifice 136 which encompasses the cap nut 14 of the injection port. The injection port flange bracket 134 may have separate adjusting screws to permit its adjustment relative to the L-flange 98 to facilitate the proper adjustment and alignment of the syringe needle 16 with the injection port 10. The particular details of the manner in which the L-flange 98 of the mounting assembly 92 is attached to the analytical instrument does not form a part of this invention since any suitable means of securing the frame to the instrument may be employed as desired. Preferably the angle bracket 130 may be bolted to the instrument cabinet 12. This mounting assembly 92 described is one assembly that has been successfully used and facilitates the rapid mounting and alignment of the automatic sampler. The adjusting screws which permit the adjustment of the injection port bracket 134 relative to the L-flange 98 are perhaps most clearly seen in FIG. 3 and bear the reference numeral 131.

Figure 6:
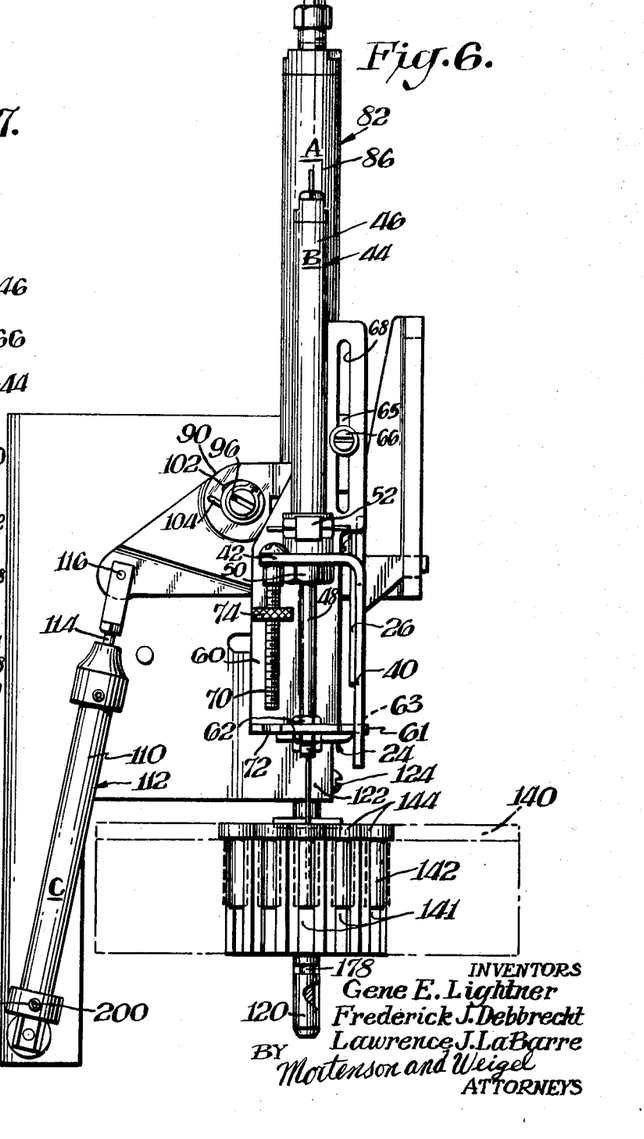
FIGURE 6 is an enlarged side elevation view of the automatic sampler illustrated in FIG. 2 shown with the syringe needle inserted into a sample container.

The turntable 140 is illustrated as being generally circular and has a circular row of apertures 141 formed in the peripheral surface thereof. A complementary shaped fluid sample container 142 is positioned, as seen most clearly in FIG. 6, within the apertures 141 of the row. Each of the sample containers 142 may be in the form of a vial having a cap or septum 144 enclosing the upper end thereof and forming a flanged portion which permits the sample containers 142 from falling through the slots which form the apertures 141. A retaining arm 143 mounted on the turntable mounting rod 120 extends across the turntable to a position partially covering the top edges of the vial septums 144 at the sampling position of the syringe. This prevents the withdrawal of the syringe from a vial from dislodging a vial.

The apertures 141 are open at the outer peripheral surface of the turntable to facilitate the indexing of the turntable with respect to the syringe 18. While the indexing of the turntable may be achieved by any suitable means such as by an electric servomotor or other drive mechanism, it is preferred that a digital type actuator be employed so that the entire automatic sampler may be operated under the control of digital impulses. A preferred digital actuator for the turntable is illustrated and seen most clearly in FIG. 3 in the form of an indexing prime mover 150 which may be a pneumatic cylinder having a barrel 152, a nipple 154 for the admission of gas pressure thereto, and a piston 156. The piston is attached to an indexing arm 158 having a slightly inwardly bent end portion 160 which engages each of the exposed peripheral slots of the apertures 141. Thus each time the indexing prime mover 150 is energized, the indexing arm 160 extends outwardly causing the turntable to rotate incrementally in a clockwise sense as denoted by the arrow 170 (FIG. 3). The indexing arm 158 is made of a spring metal such that when the spring loaded piston 156 returns, the indexing arm 158 is merely allowed to slip over into the next position such that it may engage the next successive aperture when again energized.

To aid in properly locating the apertures 141 with respect to the syringe 18, a positioner arm 172 is attached to the L-flange 98 and has a cylindrical bearing 174 which engages the exposed slot of each of the apertures 141 such that the turntable is always indexed or rotated by the proper incremental amount. The indexing prime mover 150 is mounted by a bracket 176 which is secured to the L-flange 98 of the mounting assembly 92.

The vertical position of the turntable 140 upon the turntable mounting rod 120 is determined by several grooves 178 (FIG. 6) formed in the lower periphery of the mounting rod 120. A set screw 180 (FIG. 5) may engage each of these grooves 178. The vertical adjustment of the turntable facilitates the accommodation of different size syringe needles.

Figure 11:
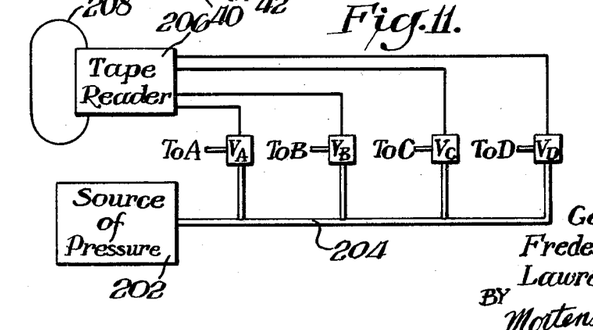
FIGURE 11 is a block schematic diagram showing the digital control system utilized to operate the prime movers of the automatic sampler of this invention.

The several prime movers, including the barrel prime mover 82, the plunger prime mover 84, the pivot prime mover 112 and the indexing prime mover 150, designated respectively by the letters A, B, C and D, are separately actuated by separate gas pressure lines connected to the respective nipples 84, 52, 200 and 154. These nipples are connected through lines (not shown) to energizing valves $V_A$, $V_B$, $V_C$, and $V_D$ illustrated in FIG. 11. The lines or conduits labelled To A, To B, To C, and To D denote the connection of these lines to the respective prime movers A, B, C, and D. These valves, designated by the blocks bearing the captions $V_A$, $V_B$, $V_C$ and $V_D$ individually apply gas pressure from a source of pressure 202 connected through a feed conduit 204 to the respective valves $V_A$, $V_B$, $V_C$, and $V_D$. The individual valves $V_A$, $V_B$, $V_C$ and $V_D$ are individually acuated under the control of electrical signals derived from preferably some control source. In this instance the control source, illustrated as a tape reader 206, is able to read a program punched tape 208 which generates control signals to individually open and close the valves which operate the respective prime movers. The particular programming sequence may be readily changed simply by punching a new tape 208 having the desired program as will be described hereinafter. Other control sources may be used as desired. For example, a rotary stepping switch may be used or, in the alternative, control may be achieved directly from a computer which may also control the analytical instrumentation system.

Figure 10:
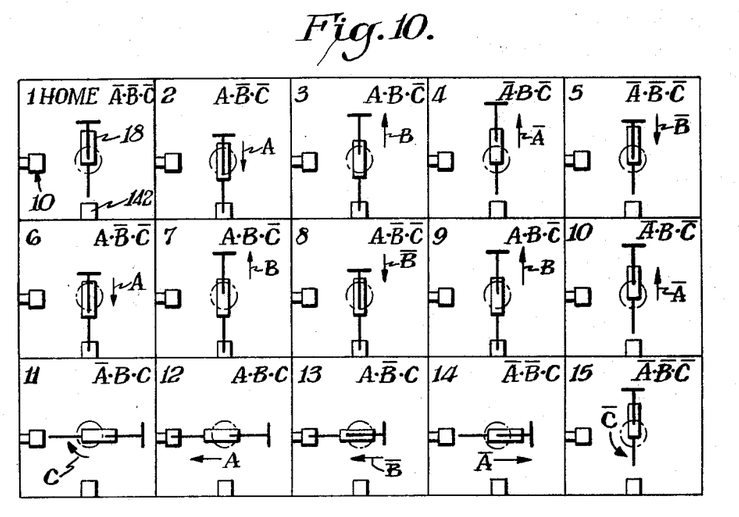
FIGURE 10 is a schematic drawing illustrating a typical program sequencing of the automatic sampler in operation.
Figure 10A:
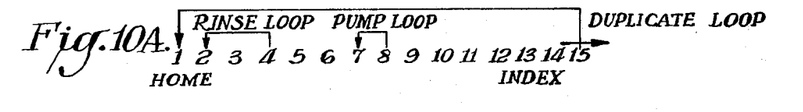
FIGURE 10A is a sequence diagram illustrating several possible loops and subloops that are possible in the control of the automatic sampler of the invention.
Figure 10B:
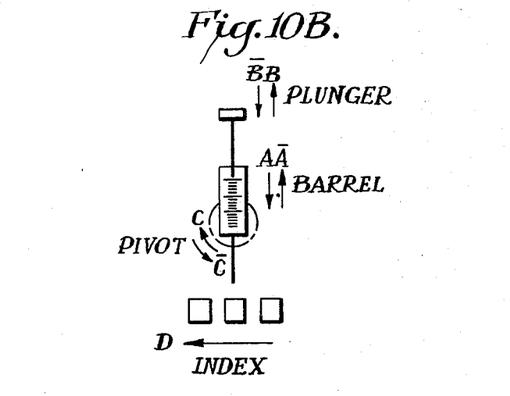
FIGURE 10B is a key to the schematic drawing of FIG. 10.

The operation of the automatic sampler-injector may perhaps be best understood with particular reference to the embodiment shown in schematic drawings of FIGS. 10, 10A and 10B. With particular reference to FIG. 10A the three motions of the syringe 18 are illustrated. These three motions are further denoted by the Boolean Algebra symbols A for when the syringe barrel prime mover is actuated and $\overline{A}$ when unactuated. In similar manner, the operations of the plunger are symbolized by the notation B corresponding to the plunger being withdrawn when the valve $V_B$ is actuated and $\overline{B}$ corresponding to the plunger being depressed when the plunger prime mover 82 is not actuated. Similarly the syringe 18 is pivoted about the pivot point 94 in a clockwise sense to be in alignment with the injection port 10 as illustrated in FIG. 1, when the pivot prime mover 112 is actuated C and conversely is pivoted in a counterclockwise direction about the pivot point 94 to be in a position to remove samples from the sample container when the prime mover 112 is not actuated C̄. Finally, the indexing prime mover 150 is denoted by the symbol D and rotates the turntable in a clockwise sense, when viewed from above, each time the indexing prime mover is actuated. The pivotal movement of the syringe barrel 20 is in a plane which includes the axis of the syringe 18 and the injection port 10. In this manner the syringe is pivoted either to pass into the injection port 10 or to be inserted into a sample container at the sampling location lying immediately below the syringe when in a vertical position.

Using three basic motions of the syringe noted by the Boolean Algebra symbols A, B, and C, samples are successively withdrawn from the several sample containers and injected into the injection port 10 of the gas chromatograph or other analytical instrument. The sequence of these particular operations is under the control of a digital controller such as that illustrated in FIG. 11 and, hence, the individual syringe movements may undergo any desired sequence. A typical operation sequence which has been utilized very successfully in achieving uniformity and repeatability of analyses is that illustrated in FIG. 10.

In FIG. 10 the syringe barrel plunger and needle are illustrated schematically in each of fifteen separate steps beginning in the block 1 in the upper lefthand corner of the block arrangement with none of the A, B or C prime movers actuated. Each is in its normal or rest position. This initial rest position is that with the plunger depressed and the syringe barrel in a vertical or upright position such as to be in a position to be inserted into a sample container 142 in the turntable 140 (FIG. 2). The injection port 10 appears in the schematic diagram as a block on the left hand portion of each of the schematic block representations. The sample container 142 is illustrated as a box in the bottom center of each step representation. As the punched program tape 208 advances through the tape reader 206 (FIG. 11) first the solenoid actuated valve $V_A$ is opened (step 2) such that air pressure is applied to the barrel prime mover 82. The barrel of the syringe 18 moves downwardly introducing the syringe needle into the sample container 142. The third step in the sequence is the enerigzation of the B prime mover 46. The plunger 22 of the syringe 18 is withdrawn. Sample fluid is withdrawn from the sample container 142 into which the syringe needle had been inserted.

In the fourth step in this sequence shown in block 4, valve $V_A$ is closed (Ā) and the syringe barrel moves upwardly again to withdraw the syringe needle from the sample container 142. This condition is that illustrated in the drawings of FIG. 7. For the next step in the sequence, illustrated in block 5, the B prime mover is deenergized to again depress the plunger. This ejects the sample just withdrawn from the sample container onto the outside of the cap portion of the container 142. The sequence of steps illustrated by the blocks 2 through 5 may be repeated as many times as necessary to perform the function of rinsing the interior of the syringe to remove any traces of a previous sample. It is during this rinse cycle that the syringe needle is successively introduced into a sample container where it withdraws a portion of the sample. The needle is then removed from the sample container and the sample ejected therefrom.

After the syringe has been suitably rinsed, the sixth step in the sequence requires that the A prime mover be energized to introduce the syringe needle into the sample container 142 with the plunger depressed. In step seven the plunger is withdrawn from the syringe by energizing the B prime mover. To insure that the syringe is free of any air bubbles or trapped gases the plunger is moved back and forth while the syringe needle is in the sample container. This sequence is illustrated in the blocks 7, 8, and 9 of FIG. 10 and also in FIG. 7, with the phantom representation of the two positions of the plunger. This sequence may be termed the pump loop during which time the plunger is successively withdrawn and depressed to insure that a full volume of sample is withdrawn from the sample vial 142.

As the tenth step in this illustrative sequence, the plunger prime mover A is deenergized to withdraw the syringe needle from the sample container. In step 11 it is seen that the pivot prime mover C is now energized to pivot the barrel of the syringe in its plane such that the syringe axis is in alignment with the injection port 10. In step 12 the A prime mover is again energized such that the syringe barrel moves forward along its new axis of orientation in alignment with the injection port 10 to insert the needle into the injection port 10. Step 13 deenergizes the plunger prime mover so that the plunger is depressed to inject the sample quickly and suredly into the injection port of the gas chromatograph. The syringe needle is again withdrawn in step 14 with the plunger depressed by the simple expedient of deenergizing the barrel prime mover A. In step 15 the pivot prime mover is deenergized to return the sampler-injector to the rest condition illustrated in FIG. 1 with the syringe in an upright position ready to be rinsed, preparatory to withdrawal of the next sample.

Not shown in this sequence of steps is the function of the indexing prime mover 150. This prime mover normally is actuated after the step 15 shown in the illustrative sequence of FIG. 10. With the energization of the indexing prime mover, as seen perhaps most clearly in FIG. 3, the rocker arm 160 engages one of the exposed apertures 141 and rotates the turntable 140 in a clockwise sense through a predetermined angle. At this point the indexing member 172 engages another aperture 141 and locks the turntable with the next sequential sample in position for the syringe to withdraw a fluid sample therefrom. If desired, the samples may be placed within the turntable in an alternating sequence of a sample and then a rinse fluid. In this sequence, the indexing prime mover is advanced after the syringe is rinsed in any desired fashion. The rinsing normally occurs prior to withdrawal of the fluid from the next sample container.

As noted herein, while the prime movers have been described as pneumatic solenoids they may also be implemented mechanically or electrically. However, the pneumatic control is preferred because of the availability of a continuous driving force over the entire lineal motion of the prime movers.

The embodiments of the invention described in FIGS. 1–11 are adapted to pivot the syringe or other sample transfer mechanism in a plane which includes the axis of the barrel of the syringe. Actually, many other motions may be accomplished using the three individually actuated prime movers, as taught by this invention, to shift the axis of the syringe barrel in a variety of ways. In addition to that described in FIGS. 1–11, the axis of the syringe barrel may be translated from one position to another. In still another alternative embodiment, the axis of the syringe barrel may be pivoted about an axis parallel to the axis of the syringe barrel. Either of these embodiments is accomplished by changing the manner in which the pivot prime mover C acts upon the bracket assembly which holds the syringe and the plunger prime movers.

Figure 12:
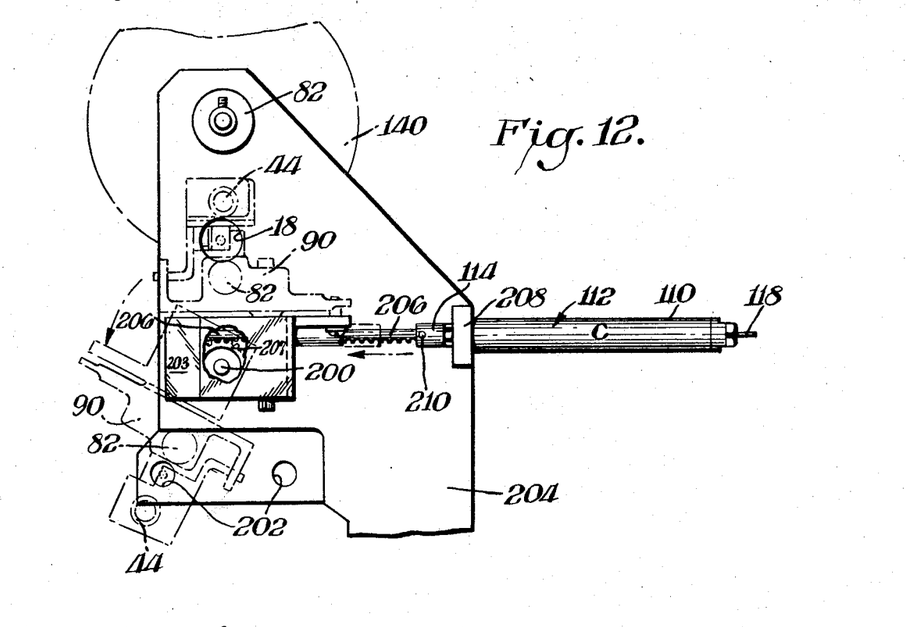
FIGURE 12 is a partial plan view of an alternative embodiment of the automatic sampler illustrated in FIG. 1.
Figure 13:
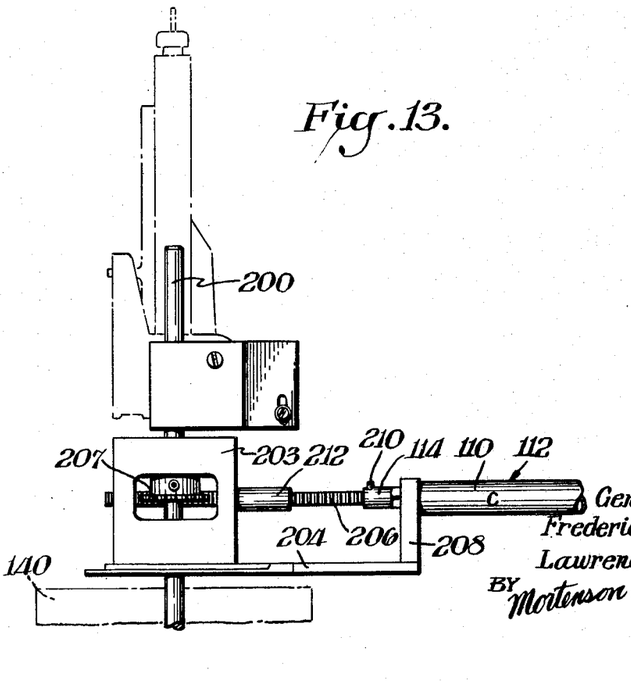
FIGURE 13 is a partial elevation view of the automatic sampler illustrated in FIG. 12.

One of these alternative embodiments is shown in FIGS. 12 and 13. This embodiment illustrated permits the axis of the syringe barrel to be rotated about an axis parallel to the axis of the barrel. Thus, in FIG. 12 the A prime mover 82 whose piston mounts the syringe and the plunger prime mover is mounted in the same pivot assembly 90 as was the case as previously described. In this instance, however, the pivot assembly 90 (FIG. 1)

which contains the barrel prime mover 82 and the plunger prime mover 44, is secured to a rotating rod 200 as is seen most clearly in FIG. 12. Preferably the rod 200 is inserted into a vertical bore formed in the pivot assembly 90 at a location close to the pivot point 94 (FIG. 1) as by a set screw, not shown. The rod itself passes through a housing 202 and is journaled into upper and lower bearings therein to permit free rotation of the rod 200. The housing 202 is secured as by screws (not shown) to a base plate 204 which may be attached if desired to an instrument or other container into which the samples are to be introduced. In this instance, the instrument is illustrated as having a pair of injection ports 202 whose axes are vertically disposed (into the plane of the drawing) such that the base plate 204 mounts upon the top of the instrument.

A gear is secured within the housing 203 to engage a sliding rack gear 206 which in turn is actuated by the C prime mover 112. The C prime mover 112 in this instance is mounted to a vertical flange 208 which forms part of the base plate 204. The piston 114 of the C prime mover 112 is bored to receive the rack gear and is secured to the rack gear 206 as by a set screw 210. A sleeve 212 may be used as desired to control the length of the stroke of the piston 114 and thereby control the amount of rotation imparted by the rack gear 206 to the gear 207 attached to the rod 200. Rotation of the rod 200 as a result of energization of the C prime mover 112 produces a rotation of the entire pivot assembly 90 including the barrel prime mover 82 and the plunger prime mover 44. Thus the syringe 18 may be rotated or pivoted about an axis (the axis of the rod 200) which is parallel to the barrel axis to permit the withdrawal of the samples from the normal sampling locations of the sample tray 140 and rotated over to the location of the vertically disposed axes of the injection ports 202. The digital control feature is still available and no further significant changes need be made in the structure.

To permit the translation of the axis of the syringe barrel, and hence of the syringe, the entire pivot assembly 90 need merely be mounted on the piston 114 of the C solenoid 112. One simple means of accomplishing this is to lock the rack gear 206 to the gear 207 and remove the screws which fasten the housing 203 to the base plate 208. Other embodiments will be apparent to those skilled in the art.

While the sample rack 140 has been illustrated in this instance as a disc it is to be understood that in alternative embodiments, the sample rack 140 may comprise an endless belt or other mechanism for positioning the samples repetitively into the sampling location such that the syringe or other sample transfer mechanism may withdraw a sample therefrom.

The apparatus described is particularly unique inasmuch as the bracket which mounts the syringe barrel is itself positioned to be driven by a prime mover, the barrel prime mover, which is mounted to be shifted by the C prime mover. This shifts both the barrel and plunger prime movers into either of two positions for operation with either the sample container or the inlet to the instrument. The degree of motion provided by the plunger prime mover is controlled by the adjusting nut 74. This unique mounting arrangement permits each of the prime movers to be individually actuated under control of a digital control signal which permits a great variety of alternative operations.

What is claimed is:

1. An automatic fluid sample supply apparatus comprising:
    a precision fluid syringe having a barrel, plunger and hollow needle aligned on a longitudinal axis;
    bracket means for holding the barrel of said syringe;
    at least one fluid sample container;
    a sample-receiving injection port;
    first actuating means for displacing said bracket means along said longitudinal axis;
    second actuating means mounted on said bracket means for displacing said plunger relative to said barrel along said axis;
    third actuating means for shifting said first actuating means and hence said bracket means between first and second positions, said first position corresponding to the alignment of said syringe with a selected one of said fluid sample containers, said second position corresponding to the alignment of said syringe with said injection port; and
    means producing digital signals for selectively energizing said first and second displacing means and said shifting means in a predetermined sequence to cause said syringe to transfer fluid from said sample container to said injection port, said selective energizing means including:
        first iterative control loop means for controlling said first and second displacing means in said first position to rinse said syringe with fluid from said sample container;
        second iterative control loop means for controlling said second displacing means in said first position to withdraw a repeatable and precisely measured volume of fluid from said sample container; and
    means for controlling said second displacing means in said second position to inject fluid from said syringe into said injection port.

2. The apparatus of claim 1, said fluid sample container being closed by an elastomeric material which is puncturable by the needle of said syringe.

3. The apparatus of claim 2,
    said first iterative control loop means including means for digitally controlling said first and second displacing means to reciprocally move said barel bracket means and said plunger alternately in sequence a predetermined number of times, thereby to repeatedly cause the needle of said syringe to puncture the elastomeric closure on said sample container and to transfer fluid out of said container; and
    said second iterative control loop means including means for digitally controlling said second displacing means to reciprocally move said plunger a predetermined number of times when said needle is immersed in the fluid in said sample container;
    said first and second iterative control loop means being operable in sequence for each fluid sampled.

4. The apparatus of claim 2, wherein the digital control means of said first iterative control loop means is operable to displace said plunger to a position inside said barrel before and not after said needle is immersed in the sample fluid, thereby to prevent the contamination of the sample fluid by any residual fluid retained in said needle from a previous sample.

5. An apparatus according to claim 1 wherein said second displacing means includes means for limiting the displacement of said plunger and hence the quantity of fluid transferred.

6. An apparatus according to claim 5 wherein said limiting means is adjustable.

7. An apparatus according to claim 1 wherein each of said displacing means and shifting means is a pneumatic cylinder having a drive piston operable by pneumatic digital signals.

8. An apparatus according to claim 1 which also includes:
    a plurality of fluid sample containers;
    means for holding said plurality of fluid sample containers; and
    fourth actuating means for individually positioning said containers in sequence into and out of alignment with the first position of said barrel axis.

9. An apparatus according to claim 1 wherein said shifting means pivots said first displacing means in a plane including said barrel axis.

10. An apparatus according to claim 1 wherein said first displacing means is mounted by said shifting means to rotate about a second axis to said barrel axis.

References Cited

UNITED STATES PATENTS

| | | |
|---|---|---|
| 3,096,653 | 7/1963 | Martin et al. |
| 3,178,266 | 4/1965 | Anthon. |
| 3,302,452 | 2/1967 | Leslie ______________ 23—259 |
| 3,418,080 | 12/1968 | Rochte et al. |

S. CLEMENT SWISHER, Primary Examiner

U.S. Cl. X.R.

23—259

UNITED STATES PATENT OFFICE
CERTIFICATE OF CORRECTION

Patent No. 3,508,442          Dated  April 28, 1970

Inventor(s)  G. E. Lightner et al

It is certified that error appears in the above-identified patent and that said Letters Patent are hereby corrected as shown below:

Column 5, delete lines 26 through 29;

Column 10, line 37, "barel" should read -- barrel --; line 50, "2" should read -- 3 --;

Column 11, line 5, after "second axis" insert -- parallel --.

SIGNED AND SEALED
SEP 15 1970

(SEAL)
Attest:

Edward M. Fletcher, Jr.
Attesting Officer

WILLIAM E. SCHUYLER, JR.
Commissioner of Patents